United States Patent Office 3,085,019
Patented Apr. 9, 1963

3,085,019
PRODUCTION OF DEHYDRATED MASHED POTATOES
Ray W. Kueneman and James E. Conrad, Caldwell, Idaho, assignors to J. R. Simplot Company, Boise, Idaho, a corporation of Nevada
No Drawing. Filed Oct. 6, 1958, Ser. No. 765,682
21 Claims. (Cl. 99—207)

This invention relates to a process of preparing dry precooked potato granules and similar particulate products or agglomerated particles and to the product prepared thereby, the product being reconstitutable to the form of ready-to-serve mashed potatoes.

Numerous prior processes have been proposed for preparing a dry mashed potato which can be reconstituted to a palatable product merely by mixing the dry product with a hot aqueous liquid such as water or milk or a mixture thereof. One such process is the "add-back" process wherein potatoes are cooked and partially dried by mixing the cooked potatoes during or after mashing with previously dried granules (sometimes called "seed"), recycled from a later stage in the process, to attain a moisture content of below about 50% for the mixture or "mix," and later dehydrated to final moisture contents of about 3–10%. Other proposed processes include drying cooked mashed potatoes with the aid of a vacuum, freezing the cooked potato to reduce the moisture content thereof, spray drying a fluid cooked mashed potato, extruding and drying shreds, dehydrating with the aid of solvents for water such as alcohol, drying a thin film of mashed potato upon a heated surface such as a rotary drum, and others. This invention relates primarily to an improvement in the add-back process. However it is generally applicable to other similar products.

Of the many problems involved in preparing a dehydrated mashed potato, that of preparing a product which may be easily used by the average person unskilled in following complex directions is of primary importance. Thus, in preparing a palatable mashed potato from add-back granules, it has been found in the past that it is necessary to use a liquid which is well below the boiling temperature of water. Similar limitations as to conditions of reconstitution have been found to exist for other forms of prior art dehydrated cooked potatoes such as shreds, flakes, and other agglomerates of individual cells. The optimum temperature as described in prior publications is said to be between about 160° F. and 180° F. for the reconstituting liquid. In trying to devise a simple set of instructions for the user in order that this temperature may be attained, it has been proposed that the user be instructed to boil water, remove it from the heat, mix cold milk with the water, and finally to mix the dehydrated potato product with the liquid. In preparing the product, it is not uncommon for the average user to fail to follow such complex instructions to the letter, and accordingly an unsatisfactory and pasty product, if the mixing liquid is at too high a temperature, is obtained leading to a reduction in the potential market for reconstitutable mashed potatoes. It is possible to obtain a product rehydratable with very hot water by methods other than disclosed herein, such as freezing cooked potatoes to reduce the moisture content thereof, but such products are not moisture-modified and heat-modified and do not have the qualities of the product of this invention.

Another problem arises in connection with measurement of the quantities of water and dry granules. In the use of prior products the longer mixing needed to add more of one of the ingredients to rectify errors in measurements or to meet the individual taste of the consumer, often resulted in undesirably low serving temperatures and in some instances poorer texture.

Accordingly it is an object of this invention to provide an improved moisture and heat modified product, for example by way of the add-back process, which product may be reconstituted by the use of a boiling aqueous liquid, and an improved process of preparing the dry product. It is another object of this invention to obtain a reconstituted mash which may be heated to or subjected to temperatures at or approaching the boiling point of water without substantial rupture of the individual cells or granules, and while still obtaining a palatable product. It is another object to so treat an add-back mixture as to modify the starch within the cells of the freshly cooked potato, within the potato cells of the add-back granules and/or any "free starch" which may be present as a result of ruptured potato cells, such modification being of a nature to permit the use of a reconstituting liquid at or near its boiling temperature. An additional object of the invention is to permit the user to add either boiling water or dry granules, or to add them alternately, while mixing, to attain either a fluffy, creamy or a relatively dry, mealy mashed potato to suit the individual's preference for texture and still maintain satisfactory serving temperatures.

These objects are accomplished, briefly, by treating the potatoes at some stage in the process such as after or during the add-back step, with a hot moist atmosphere, with critical limits as to relative humidity of the atmosphere surrounding the mix, temperature, moisture content of the potatoes, and time. The effect on the product as well as the steps in the process will be referred to as "modification," or heat-moisture modification. The relative humidity may range from 15 to 100%, being 100% at or above the temperature of atmosphere steam. The time may vary from about 1 to about 60 minutes. Temperatures range from 120° F. to 250° F. The moisture content of cooked partially or completely dried potato particles such as the seed, mix, or granules, upon which the invention is preferably practiced is between 3% and 50%. Although the process may be practiced upon material having less than 3% moisture, this is not preferred because of difficulties in reducing the moisture content to such lower values. The control of the relative humidity is an important aspect of this invention since it has been found that if cooked partially dried potato particles or cells are heated to temperatures above about 110° F. in a dry atmosphere, heat damage occurs, and if above 130° F., such damage occurs very rapidly.

The density of the product varies from about 0.35 to about 0.91. Where the potato granules consist largely of single cells, the density is between about 0.80 and 0.91, which is preferred by the military, restaurants, and large institutions, because of the small storage and shipping space required. On the other hand, individual consumers often prefer a product within the density range of 0.35 to 0.80, because of the larger package. For densities within the latter range, it is necessary to form agglomerates of the individual cells, and this has been done while utilizing the present invention. Agglomeration may be before or after modification. "Agglomeration" as used above applies to small agglomerations of the order of size of flakes and shreds. However, "agglomeration" may include still larger aggregate such as bricks or blocks of dehydrated potatoes formed either by pressure or by uniting the individual particles by the use of a binder, in which case the density would be higher than for the small agglomerates. The blocks or bricks are self-supporting or self-sustaining units of higher density, and are stable to disintegration under moderate stress.

Conventional add-back methods of preparing potato granules include various stages, such as mixing the freshly cooked mashed potatoes with the add-back material (sometimes called "seed"), mashing and adding the seed simultaneously (the mixture is sometimes called "the mix" or the "wet mix" hereinafter), equilibrating the moisture content of the seed and freshly cooked vegetable, additional mixing, and cooling the mix and holding or tempering the same at low temperatures to obtain starch retrogradation, obtain additional equilibration, and avoid microbiological damage. Other steps include the addition of other food ingredients such as milk, dry milk, and reconstituted dry milk, flavoring agents such as salt and pepper, emulsifiers, and preservatives. In addition various sifting or particle size separation steps and drying operations are performed, the drying methods used being very gentle to avoid impact and abrasion damage to the fragile potato cells.

The present invention may be performed at any stage of the process after the add-back of seed or upon the seed itself. Thus, the process of this invention (which will be referred to as "modification" in view of the fact that the rehydration characteristics of the potato cells and of the free starch are altered as indicated herein) may be performed upon the wet mix having a moisture content of between about 25% and 50%. Of course, seed may be added to reduce the moisture content of the mix to a greater extent, but this is not economically feasible, although technically practicable and within the scope of the invention. The process may be performed upon the dry seed, having a moisture content of about 9% to about 20%. A reduction to below 9% is not economical, and at above 20%, separation of seed from the end product is difficult, although the seed may have a moisture content outside of this range and still be used in this invention. Modification may take place in a mixer-masher simultaneously with mashing and the addition of seed. During drying, the modification may be performed by adhering to the conditions as specified herein, and the same is true as to the finished dry product. Dry granules may be used and have about 3-12% water.

After equilibration, after cooling and holding, in an interval between stages of cooling and holding, before, during, or at any interval in the drying operation, and at two or more points in the process are other steps where the present invention may be carried out.

Extreme care must be taken to minimize impact and abrasion damage such as occurs in some types of conveying and drying apparatus. Various methods of applying heat to attain the desired temperatures of modification may be used, examples being direct steam, electric heaters, moist air, or the material itself may be preheated or one or more components preheated and then blended with other components. The control of relative humidity may be attained by autogenous steam generated from the wet or moist mix or product itself or may be supplied by an outside source such as wet vapor or steam, or other humid atmosphere such as moist inert gas.

As indicated herein there is some correlation between temperature, humidity, moisture of the product being modified, and time. For a raw material product or mixture of a given moisture content the following generalizations may be made.

(1) At low reacting temperatures and in the lower humidity ranges longer time is required.

(2) At high reacting temperatures and low humidity ranges less time is required than in the conditions described by (1) above.

(3) At high reacting temperatures and high humidiyt ranges a shorter time is required than either (1) or (2) above.

(4) At any given condition or combination of (1), (2) and (3) an increase of moisture during the reaction will further decrease the required time.

These variables of time, temperature, relative humidity and moisture content may be altered in a number of permutations depending upon the type of product or material being modified, and, the amount of free starch available caused by damage or abrasion during material handling, but in such a controlled manner to avoid color and flavor deterioration in the finished product.

It is essential to avoid overmodification which may lead to a "case hardened" product that will not rehydrate properly, or to products having a dark color, as well as to further deterioration such as is evidenced by an unpleasant taste and odor, variously described as metallic, baked and scorched.

In order to accomplish control of the process, two product properties susceptible of objective evaluation which may be used in the present invention are "blue value" especially for potato granules, and color. In addition, subjective evaluations such as general appearance and flavor are of value.

Blue value is determined by a procedure, slightly modified, described by Mullins, Harrington, Olson, Wood and Nutting in Food Technology, volume 9, pp. 93–5 (1955).

The modified procedure is as follows:

(1) 2.5 grams of product is used (moisture content 5–12%).

(2) Extract in 500 ml. of water at 150° F. with agitation.

(3) Filter and add 5 ml. of filtrate to 44 ml. of distilled water and 1 ml. of 0.02 N iodine solution.

(4) Read percent transmission in Klett Summerson Colorimeter using red filter. Colorimeter previously standardized with 1 ml. of 0.12 N iodine solution in 49 ml. distilled water.

The blue values may be corrected to a moisture-free product basis if desired. Of course, other objective evaluations of quality and texture may be used in place of or in addition to blue value and/or subjective evaluations. However, blue value has been found eminently suitable, correlates well with subjective evaluations, and permits relatively accurate simultaneous evaluation of free soluble starch and texture. Blue values between 0 and 55 have been found generally to indicate a product resistant to boiling water upon rehydration, giving a palatable mashed potato having a friable, mealy, fluffy texture, being free of gumminess, stickiness, pastiness and lumps, and having a low free starch content. For a more uniform product of balanced quality factors of color, flavor, odor, and texture, the blue value of the end product may be limited to values between 25 and 45.

The color of the dry product is evaluated according to standards established in the United States military specifications for potatoes, white, dehydrated Mil–P–1073A dated 12 December 1955, and amendments. Standards may be made up from glass beads, powdered glass, and pigments as specified therein, to correspond to the following:

| Color | Chromaticity coordinates | | Luminous reflectances, (R_c), percent |
|---|---|---|---|
| | $y$ | $z$ | |
| Good | .3500 | .3372 | 76.9 |
| Borderline | .3530 | [1] .3430 | [1] 70.0 |
| Poor | .3580 | .3496 | 65.3 |

[1] Approximately.

Since heat damage from overmodification is indicated in part in the product by color changes, color determination is a valuable control procedure in this invention, and gives one measurement of the extent of modification. Wherever reference is made to a product evaluated as being "dark" the qualities fall within the definition of "poor" above. "Borderline" or better is esthetically acceptable to the average discriminating person.

*Example 1*

This example shows that "modification" can take place at various moisture contents, relative humidities, temperatures, and times to improve texture and lessen cell rupture and free starch paste formation in boiling water reconstitution as shown by decrease in "blue value" and finished product evaluations.

Unmodified reconstitutable potato products, granules in this case, of known blue value, color, flavor, odor and texture characteristics at approximately 7% moisture content were equilibrated with room temperature water to the following various moisture contents, treated with vapor of the following relative humidities, temperatures, and times then dried again to approximately 7% moisture content and evaluated for difference against original material for factors of blue value, color, flavor, odor and texture characteristics using boiling water reconstitution.

A decrease in blue value as indicated by the negative symbol (—) improved texture significantly when reconstituted with boiling water.

Since these significant improvements were made on remoistened finished product, a wide number of similar conditions were imposed directly in process in order that these improvements could be demonstrated as practical processing conditions.

The data presented in the following table show the changes obtained when add-back mixtures consisting of freshly cooked potatoes and "seed" were prepared into mixes at various moisture contents and subjected to "modification" using varying conditions of moisture, humidity, temperatures and time. These mixes were "modified" then dried. Each sample was cycled 7 to 10 times, using freshly cooked potato and seed from the previous cycle each time, to show that these changes were significant. The products were dried after modification and evaluated.

| Sample No. | Treatment | | | | After modification evaluation using boiling water reconstitution, 113.5 grams dry matter to 2 cups boiling water | | | | |
|---|---|---|---|---|---|---|---|---|---|
| | H₂O content, percent | Percent relative humidity | Temp., °F. | Time, min. | Change in blue value | Color | Flavor | Odor | Texture |
| 1 | 41 | 70 | 160 | 35 | −76 | Equal | Equal | Equal | Better. |
| 2 | 56 | 90–100 | 204 | 30 | +69 | Poor | Poor | Poor | Poor.[1] |
| 3 | 56 | 90–100 | 190 | 30 | −7 | do | do | do | Do.[1] |
| 4 | 15 | 90–100 | 180 | 30 | −54 | Sl. darker | Equal | Equal | Better. |
| 5 | 36 | 90–100 | 204 | 30 | −15 | Dark | Poor | Poor | Do. |
| 6 | 28 | 90–100 | 130 | 30 | −41 | Equal | Equal | Equal | Do. |
| 7 | 36 | 90–100 | 120 | 30 | −39 | do | do | do | Do. |
| 8 | 46 | 90–100 | 120 | 30 | −53 | do | do | do | Do. |
| 9 | 46 | 20 | 130 | 30 | −13 | (Remainder of samples had color, flavor, odor, and texture comparable to sample No. 8) | | | |
| 10 | 46 | 40 | 130 | 30 | −32 | | | | |
| 11 | 46 | 60 | 130 | 30 | −45 | | | | |
| 12 | 46 | 80 | 130 | 30 | −59 | | | | |
| 13 | 46 | 100 | 130 | 30 | −57 | | | | |
| 14 | 46 | 20 | 150 | 30 | −33 | | | | |
| 15 | 46 | 40 | 150 | 30 | −59 | | | | |
| 16 | 46 | 60 | 150 | 30 | −42 | | | | |
| 17 | 46 | 80 | 150 | 30 | −59 | | | | |
| 18 | 46 | 100 | 150 | 30 | −73 | | | | |
| 19 | 36 | 20 | 170 | 30 | −25 | | | | |
| 20 | 36 | 40 | 170 | 30 | −31 | | | | |
| 21 | 36 | 60 | 170 | 30 | −48 | | | | |
| 22 | 36 | 80 | 170 | 30 | −62 | | | | |
| 23 | 36 | 100 | 170 | 30 | −72 | | | | |
| 24 | 28 | 20 | 170 | 30 | −12 | | | | |
| 25 | 28 | 40 | 170 | 30 | −38 | | | | |
| 26 | 28 | 60 | 170 | 30 | −47 | | | | |
| 27 | 28 | 80 | 170 | 30 | −60 | | | | |
| 28 | 28 | 100 | 170 | 30 | −12 | | | | |
| 29 | 15 | 90–100 | 140 | 30 | −28 | | | | |
| 30 | 15 | 90–100 | 160 | 30 | −7 | | | | |
| 31 | 15 | 90–100 | 180 | 30 | −66 | | | | |
| 32 | 15 | 90–100 | 200 | 30 | −99 | | | | |
| 33 | 15 | 90–100 | 210 | 30 | −82 | | | | |
| 34 | 33.2 | 100 | 230 | 2½ | −27 | | | | |
| 35 | 23.1 | 100 | 230 | 2½ | −60 | | | | |
| 36 | 13.2 | 100 | 230 | 2½ | −46 | | | | |
| 37 | 9.8 | 100 | 230 | 2½ | −35 | | | | |

[1] Hard and horny.

Samples 34 through 37 were prepared from a material having an original blue value of 78, and direct steam was used to control temperature.

Samples 4 and 29 through 33 illustrate the feasibility of conducting modification during drying.

Samples 2 and 3 illustrate conditions outside the invention, as does sample 5, wherein excessive modification occurred, as illustrated by the control data.

It was clearly demonstrated by example number 1 that significant improvement in texture of reconstituted dried potato granules was achieved when using boiling water for reconstitution, the granules being at various moisture contents when subjected to the modification treatment at varying humidities and temperatures. The examples given were tested at a single time for standardization, however other conditions were studied and similar improvement was obtained at different time intervals.

*Example 2*

| No. | Mix moisture content, percent | Number of cycles | Temp., °F. | Percent relative humidity | Time in min. | Change in blue value end of cycles |
|---|---|---|---|---|---|---|
| 1 | 36 | 10 | 180 | 90–100 | 15 | −105 |
| 2 | 36 | 10 | 180 | 90–100 | 3 | −140 |
| 3 | 26 | 10 | 160 | 90–100 | 15 | −82 |
| 4 | 36 | 7 | 150 | 90–100 | 15 | −74 |
| 5 | 36 | 10 | 140 | 90–100 | 15 | −53 |
| 6 | 36 | 10 | 130 | 90–100 | 15 | −39 |

The above samples were significantly better in quality after these treatments. Additional cycles gave comparable results.

Having demonstrated clearly the feasibility of "modification" under production conditions as shown by Example 2 various production applications at different process points were demonstrated.

*Example 3*

This example was conducted under conditions similar to Example 2, but modification was during the mixing of add-back granules (seed) and of hot, cooked potatoes. The moisture content of the mixture was 32–34%, and the temperature of the humid atmosphere was controlled to maintain a potato temperature in excess of 120° F. for a predominant proportion of the time used to conduct the mixing and modification step, and did not fall substantially below about 116° F. during mixing.

| Run No. | Total cook time, min. | 90–100% RH modification step | | Number cycles | Blue value | | |
|---|---|---|---|---|---|---|---|
| | | Mixing time, min. | Mixing, r.p.m. | | Original control | After modification | Difference |
| 1 | 41 | 18 | 50 | 11 | 92 | 34 | −58 |
| 2 | 39 | 9 | 20 | 11 | 92 | 40 | −52 |

The above data clearly demonstrates practical primary mixing times with significant improvement in blue values, however more fine material was obtained from run 1 than run 2. The product was palatable to expert tasters and was friable, mealy, of fluffy texture, and free of gumminess, stickiness, pastiness, and lumps, when reconstituted with aqueous liquid added immediately after boiling the same.

While the process is believed to have the greatest utility in producing an improved, modified add-back product predominantly in the form of separate, individual potato cells or agglomerate thereof, it may be applied to other materials with the same limitations as to conditions of time, temperature, humidity, moisture content and product control. Such other materials include a mass or body such as potato shreds, flakes, and blocks or bricks and modification may take place during or after manufacture. "Potato shreds" are the result of extruding cooked mashed potatoes and drying the same, and may be approximately three thirty seconds to five thirty seconds inches in diameter and up to one inch in length, or may be aggregated to form larger particles. "Potato flakes" may be made by various methods such as drying a thin film of mashed potatoes or diluted mashed potatoes, for example on the surface of a heated drum, and may be in the form of friable, paper-thin, translucent flakes about ½ inch by ½ inch.

The following examples illustrate that other materials may be used:

*Example 4*

Similar modification to that of Example 1 was attained when the process was applied to potato shreds, the quality including the texture and free starch corresponding to that of add-back granules having a blue value of 0–55, and a color of "borderline" or better.

*Example 5*

When the process of Example 1 is applied to potato flakes, similar results may be obtained. Qualities including the texture and free starch corresponding to that of an add-back granule having a blue value of 0–55 and an acceptable color may be attained.

A sample of potato flakes was modified by steam treatment of 10–12 p.s.i.g. for 3½ minutes and the blue value was reduced 60 points. The color was impaired but the texture was significantly improved.

Flakes containing certain emulsifiers such as glycerol mono palmitate show abnormalities in blue value determinations because the melting points are in excess of the 150° extraction temperature used in the standard method.

In these cases the effect of modification must be evaluated subjectively by rehydration in a boiling aqueous solution.

The process as conducted upon flakes may be upon the dry flakes themselves or any stage during the manufacture. For example, the drying apparatus such as a heated drum may be modified by arranging a hood around a portion of the circumference thereof in order to control the relative humidity and to achieve the other conditions of the invention such as moisture content of the material being modified, temperature, and time. Similarly other products may be modified during or after manufacture. Shreds, for instance, may be modified after extrusion and as a step during, after or prior to drying or partial drying of the product.

In the "mixer modification" embodiment of this invention as applied in the add-back process, (the point in the process where seed is added prior to, during, and/or after mashing) narrower ranges of conditions are preferable, and may even be critical in some situations. The cooked potatoes are added to the mixer at a temperature of between about 150° F. and 212° F., and the add-back granules or seed added at a temperature of up to 140° F. The maximum temperature for the seed is ordinarily about 120° F. because of the possibility of heat damage, but momentary temperatures of 130° F. or above may be used. The seed may be at any temperature below 140° F., for example at 50° F. The moisture content of the mixture may be between 3 and 50% and is preferably between 25% and 45%, and the relative humidity is held between 70% and 100%, mixing being continued until the temperature of the mixture drops to between about 112 and 128° F. Appropriate control procedures to limit the extent of modification are applied, of course.

It is postulated that the primary reason difficulties are encountered in reconstitution of prior art potato granules or other similar particulate or agglomerated products is that the intercellular gelatinized starch rehydrates at such a rate that the cell wall is in a friable state at the instant the rehydration causes the starch to exceed the space provided by the cell wall. If the potato cell wall ruptures during reconstitution, or previously broken cells are present, free starch is liberated, leading to a mashed potato of poor texture when a sufficient number of cells is ruptured. Such unsatisfactory texture is variously described as pasty, gluey, gummy, and sticky. Not uncommonly such mashed potato contains lumps. The product lacks palatability, and has little resemblance to freshly cooked mashed potatoes prepared from raw potatoes. Some free starch is ordinarily present whatever the method of preparing potato granules. In prior products, it is believed that upon reconstitution the free starch whether previously present or liberated by reconstitution, rehydrates to a form equivalent to a "long gel" of pure starch, being glossy in appearance, translucent, stringy and gluey.

The "modification" of the present invention is believed to alter the characteristics of the intercellular starch to control the hydration rate thereof or to reduce the friability or moisture-passing qualities of the cell wall, or any combinations of these results. The "free-soluble" starch is believed to be modified to a "short gel" form, having an almost crystalline sheen, being white and opaque but essentially having no stickiness. The actual physical and chemical changes in the cell structure and the structure of the starch molecule having not been clearly established. However, there is evidence to indicate that the starch molecules are cross-linked, leading to retarded swelling and the short gel characteristics of the modified product allow a short gel paste. The above theory is offered by way of a possible explanation of the phenomena discovered by the present inventors, and is not intended to be a limitation upon the invention.

The methods useable for reconstituting the modified product offer little room for error. There is no need to rely upon the user to follow directions to attain cooling of the reconstituting liquid to temperatures of about 160° F.–180° F., since the aqueous liquid for example may be boiled, taken off the stove or other source of heat, and immediately mixed with the modified granules. Exact measurements are not needed, and continuous mixing in an electric mixer with double beaters while alternately adding water at near its boiling temperature and modified granules at room temperature yields a product having improved physical and gustatory properties, thus meeting the preferences of the individual user as to the end product. However, the prior art product (prepared with aqueous liquid at 160° F.–180° F.) reaches the table lukewarm instead of a desirable hot temperature. The reconstituted modified mashed potato has been held on a steam table or hot plate at temperatures of for instance from 160° F. to 190° F. for periods in the neighborhood of five hours without appreciable damage to the texture, flavor, or color. In fact, the product was better than any commercial prior add-back granule, and greatly superior to fresh mashed potatoes, as to steam table life.

It is even possible to reconstitute the product described herein at lower temperatures, for example 150° F., and then to place the material on a heat source such as a steam table and heat it to serving temperature. Serving temperatures of a soft food, such as mashed potato, should be in the neighborhood of 180° F. so that it is eaten when between about 130° F. and 160° F. Immediately after reconstituting with boiling water, the mixture is about 5° F.–30° F. below the water temperature, and by the time the material is transferred to another container and served, it is still above eating temperature. On the other hand, prior products, immediately after reconstituting with 160° F.–180° F. water are at such low temperatures that they may be eaten almost immediately, but by the time such products are served and eaten, they are lukewarm (about 120° F.).

By way of illustration, identical conditions were used to prepare two small batches of reconstituted mashed potatoes except that boiling water (207° F.) was used for one batch and water at 160° F. for the other. Immediately, after reconstitution the mixtures were at 180° F. and 144° F. respectively, and after a few minutes in open pans were at 160° F. and 125° F., respectively.

The aqueous liquid heated to about its boiling temperature may be water, milk, reconstituted dry milk, other water containing liquids or solutions and may comprise flavoring and other ingredients. Where boiling water or temperatures near that of boiling water are specified, temperatures of over about 185° F. and at about 212° F. or under are intended.

Proportions of aqueous liquid and dehydrated potatoes useable to produce a rehydrated mashed potato having the extremes of creaminess and dryness, as preferred by individual persons, are between 300 and 550 cubic centimeters of hot water or other aqueous liquid to 113.5 grams of dry product (between about 3 and 12% moisture).

Unless otherwise indicated herein, where a material is said to be "subjected to" a particular temperature, the material itself is heated to that temperature. This is to be distinguished from for example a conventional drying process in which relatively dry air at up to 400° F. is used, but because of evaporation the potato substance itself does not reach a temperature exceeding about 110° F., even though according to the meaning sometimes used in the art (but not in this application) the material is "subjected to" a temperature of 400° F.

We claim:
1. In a process of preparing a mass of precooked potatoes including the steps of cooking raw potatoes and reducing the moisture content thereof to a value below about 50%, the improvement of enhancing the palatability and texture and reducing the free starch content thereof comprising the steps of maintaining the potatoes of said reduced moisture content at a temperature of between about 120° F. and about 250° F. for a time of from about 1 minute to about 60 minutes, while maintaining in contact therewith an atmosphere having a relative humidity of between 15% and 100%, drying the product and storing the same, whereby a product is obtained which is palatable to humans by objective and subjective evaluations, the product being reconstitutable to said palatable product by the use of an aqueous liquid at a temperature of between about 185° F. and 212° F., and which product has a blue value below that of an otherwise similar product not subjected to the hereinbefore recited conditions of temperature and relative humidity.

2. The process of claim 1 in which an end product comprising agglomerates of potato cells is formed.

3. The process of claim 1 in which an end product comprising add-back granules is formed.

4. The process of claim 1 in which an end product comprising shreds is formed.

5. The process of claim 1 in which an end product comprising flakes is formed.

6. The process of claim 1 in which the end product is in the form of granules, and said relative humidity is about 100%.

7. The process of claim 1 which includes reducing the moisture content of the cooked potatoes to a value below about 50% but not below about 25% prior to applying the recited conditions of temperature and humidity.

8. The process of claim 1 in which the starting material is a dry potato product.

9. A product produced by the process of claim 1, said product having a free starch content and textural properties corresponding to a blue value of between 0 and 55.

10. In a process of preparing a mass of precooked, dry, add-back potato granules, comprising the steps of cooking the potatoes, mashing the cooked potatoes, and adding previously dried seed in sufficient quantity to reduce the moisture content of the mixture to a value below about 50%, the improvement comprising modifying the mixture to improve the texture and reduce the free starch content thereof by subjecting the mixture of reduced moisture content to a temperature between 120° F. and 250° F. for a period of from about 1 to about 60 minutes while maintaining the relative humidity of the atmosphere in direct contact with the mixture at a value of between 15% and 100%, drying the granules, and controlling the process so that said modified granules have the property of being reconstitutable with aqueous liquids at a temperature between about 185° F. and 212° F. to a palatable mashed potato product.

11. The process of claim 10 in which time generally is varied inversely with temperature.

12. The process of claim 10 in which humidity is approximately proportional with the temperature.

13. The process of claim 10 in which modification is conducted during the mixing of cooked potatoes and seed.

14. The process of claim 13 wherein the final free starch content and textural properties correspond to a blue value of less than about 55.

15. The process of claim 10 in which the modification is performed in connection with the drying steps.

16. The process of claim 10 conducted in at least two stages, one stage being during mixing of the cooked potatoes and seed and another in connection with the drying steps.

17. The process of claim 10 wherein modification is conducted at least in part at a point between mixing and drying.

18. The process of claim 10 conducted upon dry granules.

19. A process of preparing a mass of precooked, add-back potato granules having the property of being reconstitutable to a palatable mashed potato product with aqueous liquid at a temperature above about 185° F., comprising the steps of cooking the potatoes, mashing the cooked potatoes while adding previously dried granules recycled from a later stage in the process, the cooked potatoes before mixing being at a temperature of between about 150° F. and 212° F., the add-back granules being at a temperature up to about 140° F., the moisture content of the mixture being between about 3% and 50%, the mixture being at a temperature of above about 120° F. and below a temperature of about 250° F., the mixing being conducted for at least approximately 5 minutes and for no more than approximately 60 minutes, said mixing being continued until the temperature is reduced to between about 112° F. and 128° F. the relative humidity in the mixer being maintained between 70% and 100%, the temperature of the mixture being held above about 120° F. for a period of time sufficient to achieve said property, and drying the granules.

20. The process of claim 19 in which the mixture is subjected to additional mixing, equilibrating, cooling, and holding stages.

21. The process of claim 19 in which the moisture content of the mixture is between about 25% and 45%.

References Cited in the file of this patent

UNITED STATES PATENTS 2,780,552     Willard et al. _____ Feb. 5, 1957

OTHER REFERENCES

Advances in Food Research, vol. 6, 1955, page 234.